US007914841B2

(12) United States Patent
Eells et al.

(10) Patent No.: US 7,914,841 B2
(45) Date of Patent: Mar. 29, 2011

(54) INLINE APPLICATION OF COATINGS

(75) Inventors: Scott E. Eells, Bloomington, IN (US); David R. Lessard, Bloomington, IN (US)

(73) Assignee: Cook Medical Technologies LLC, Bloomington, IN (US)

( * ) Notice: Subject to any disclaimer, the term of this patent is extended or adjusted under 35 U.S.C. 154(b) by 1092 days.

(21) Appl. No.: 11/700,984

(22) Filed: Feb. 1, 2007

(65) Prior Publication Data

US 2007/0182055 A1 Aug. 9, 2007

Related U.S. Application Data

(60) Provisional application No. 60/771,652, filed on Feb. 9, 2006.

(51) Int. Cl.

| | |
|---|---|
| ***B05D 3/02*** | (2006.01) |
| ***B05D 3/10*** | (2006.01) |
| ***A61M 25/00*** | (2006.01) |
| ***B28B 3/20*** | (2006.01) |
| ***B29C 47/88*** | (2006.01) |

(52) U.S. Cl. ........ 427/2.1; 427/2.24; 427/2.28; 427/2.3; 427/289; 427/293; 264/165; 264/176.1; 264/177.17; 264/177.18; 264/211.12; 264/211.13

(58) Field of Classification Search .................. 427/2.1, 427/2.24, 2.25, 2.28, 2.3, 289, 293; 264/165, 264/176.1, 177.17, 177.18, 211.12, 211.13

See application file for complete search history.

(56) References Cited

U.S. PATENT DOCUMENTS

| | | | | |
|---|---|---|---|---|
| 3,485,234 A | | 12/1969 | Stevens | |
| 4,856,529 A | * | 8/1989 | Segal | 600/454 |
| 4,898,591 A | | 2/1990 | Jang et al. | |
| 5,017,259 A | * | 5/1991 | Kohsai | 156/294 |
| 5,084,315 A | * | 1/1992 | Karimi et al. | 428/36.6 |
| 5,156,785 A | * | 10/1992 | Zdrahala | 264/108 |
| 5,669,920 A | | 9/1997 | Conley et al. | |

(Continued)

FOREIGN PATENT DOCUMENTS

DE 33 25 321 A1 1/1985

(Continued)

OTHER PUBLICATIONS

The International Search Report and the Written Opinion for corresponding PCT Application Serial No. PCT/US2007/003310, dated Sep. 5, 2007.

*Primary Examiner* — Timothy H Meeks
*Assistant Examiner* — Cachet I Sellman
(74) *Attorney, Agent, or Firm* — Brinks Hofer Gilson & Lione

(57) ABSTRACT

A method of forming a coated medical device is described. A coating may be applied inline to a continuous tubing formed by extrusion, prior to cutting and secondary operations. Thus, inefficient and labor-intensive steps associated with preparing individual tubes for coating may be avoided. The method may include forcing a flowable material through an exit port of an extruder, depositing a coating onto at least a portion of the continuous length of extruded tubing after the tubing is forced through the exit port, cutting the coated tubing to a desired length after depositing the coating, and performing one or more secondary operations on the coated tube at a temperature in the range of from about 15° C. to about 375° C.

18 Claims, 2 Drawing Sheets

110 Extruding
120 Cooling
130 Drying
140 Coating
150 Curing
160 Cutting
170 Secondary operations

U.S. PATENT DOCUMENTS 5,997,517 A 12/1999 Whitbourne
6,309,584 B1 10/2001 Kientz et al.
6,447,835 B1 * 9/2002 Wang et al. .................. 427/2.24
6,505,066 B2 1/2003 Berg et al.
6,663,913 B2 12/2003 O'Donoghue et al.
6,669,994 B2 12/2003 Swan et al.
6,671,561 B1 12/2003 Moaddeb
6,702,972 B1 3/2004 Markle
6,939,337 B2 9/2005 Parker et al.
7,670,526 B2 * 3/2010 Solar et al. .................... 264/260
2001/0006700 A1 7/2001 Nazarova et al.
2002/0084551 A1 * 7/2002 Lee ........................... 264/209.6
2002/0132540 A1 9/2002 Soerens et al.
2003/0088209 A1 5/2003 Chiu et al.
2004/0121037 A1 6/2004 Rouns et al.
2004/0137164 A1 7/2004 Swan et al.
2004/0265475 A1 12/2004 Hossainy et al.
2005/0203201 A1 * 9/2005 Steube ............................ 522/15
2005/0283136 A1 * 12/2005 Skarda .......................... 604/526
2007/0075452 A1 * 4/2007 Leeflang et al. .............. 264/129

FOREIGN PATENT DOCUMENTS

EP 0 480 809 A2 4/1992

* cited by examiner

INLINE APPLICATION OF COATINGS

RELATED APPLICATIONS

The present patent document claims the benefit of the filing date under 35 U.S.C. §119(e) of Provisional U.S. Patent Application Ser. No. 60/771,652, filed Feb. 9, 2006, which is hereby incorporated by reference.

TECHNICAL FIELD

The present invention relates to the manufacturing of medical devices, in particular to the manufacturing of coated medical devices.

BACKGROUND

Coatings may be applied to medical devices to provide certain advantages or functionality. For example, a coating may increase the lubricity of the surface of a medical device and/or serve as a reservoir for a bioactive substance.

A catheter is an example of a medical device that may benefit from a coating. Catheters are elongated, flexible tubular instruments that may be inserted into a body cavity or blood vessel and maneuvered to a desired site for diagnostic or therapeutic purposes. In order to minimize friction, thrombosis, tissue trauma, tissue adhesion, and/or other effects, it may be beneficial to coat the surface of a catheter with a lubricious coating. If the catheter has a therapeutic purpose, it may be desirable to apply a coating that is capable of containing and releasing a bioactive agent.

Conventionally, the application of a coating to a medical device such as a catheter entails a number of labor-intensive processing and handling steps. In one conventional process, a continuous length of extruded tubing may be cut into one or more tubes prior to application of the coating. Each tube may further undergo forming or bonding operations before the coating is applied. Plugs may be inserted into the ends of each tube to prevent the coating from penetrating into the inner core, or lumen, of the tube during the coating process. Each plugged tube may be placed onto a fixture for transfer to a coating tank for application of the coating. After the coating has been applied, each plugged tube may be transferred to another location for removal of the fixture and plugs. Additionally, the removed plugs may undergo a cleaning process to eliminate the coating residue before being returned to production. The insertion and removal of the plugs from each tube, the placement of each tube in and its removal from the fixture, and the cleaning of the plugs are typically carried out manually. In a high-volume manufacturing environment, one hundred thousand or more tubes may require such handling each month.

Thus, the overall efficiency of the process to produce coated medical devices could be improved by eliminating labor-intensive processing and handling steps.

BRIEF SUMMARY

The method described herein may provide advantages over conventional methods of forming coated medical devices. In the present method, a coating is applied inline to a continuous tubing formed by extrusion, prior to any cutting or secondary operations. Inefficient, labor-intensive steps associated with processing and handling individual tubes for coating (e.g., plugging the ends of each tube, loading each tube into a fixture) may be avoided, thereby leading to a more streamlined manufacturing process.

This method is possible when secondary operations (e.g., bonding and/or forming operations) carried out after application of the coating do not substantially impair the integrity or quality of the coating nor inhibit the formation of an effective and reliable bond between the coated tube and another structure. Such secondary operations may be necessary to form implantable or insertable medical devices from the coated tubes. This method is also advantageous with coating formulations that may be cured in a short time.

According to one embodiment, the method includes the following steps: forcing a flowable material through an exit port of an extruder, thereby forming a continuous length of extruded tubing; depositing a coating onto at least a portion of the continuous length of extruded tubing after the tubing is forced through the exit port, thereby forming a continuous coated tubing; cutting the coated tubing to a desired length after depositing the coating, thereby forming a coated tube; and performing one or more secondary operations on the coated tube at a temperature in the range of from about 15° C. to about 375° C., thereby forming a coated medical device.

DETAILED DESCRIPTION

Figure 1:
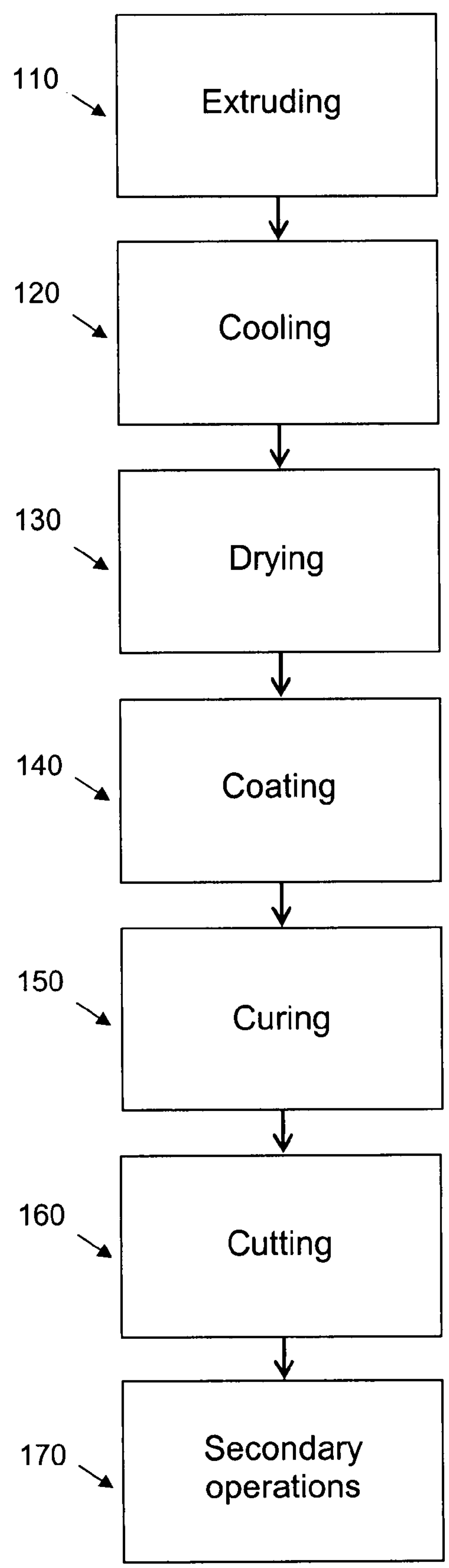
FIG. 1 is a flow chart showing the steps of the method according to one embodiment.

The flow chart shown in the figure identifies the steps of the method according to one embodiment. First, a flowable material may be forced through an exit port of an extruder in order to form a continuous length of extruded tubing 110. Next, the extruded tubing may be cooled by, for example, passage through a liquid bath 120. The extruded tubing may then be dried using, for example, warm air blowers 130. In a next step, a coating may be deposited onto at least a portion of the extruded tubing to form a coated tubing 140. The coated tubing may further undergo a curing step 150. After depositing the coating, the coated tubing may be cut to a desired length, in order to form one or more coated tube(s) having a distal end and a proximal end 160. Finally, secondary operations may be performed on the coated tube at a temperature in the range of from about 15° C. to about 375° C. to form a coated medical device 170.

The step of forcing a flowable material through an exit port of an extruder to form a continuous length of extruded tubing may be carried out using conventional extrusion equipment known in the art. The flowable material may be any material that can be extruded. Preferably, the material may include one or more polymers, such as, for example, a polyamide (e.g., nylon), thermoplastic fluorocarbon (e.g., fluoroethylene-propylene (FEP)), polyether block amide (PEBA), polyolefin, polyimide, polyurethane, or polyvinyl chloride (PVC). According to one embodiment, the polymer is nylon. The rate at which the material is extruded may vary over a wide range depending, for example, on the dimensions of the tube and downstream process variables, such as curing time, which will be discussed below.

Any size of tubing that can be extruded may be coated using the method described herein. For example, the outer diameter of the extruded tubing may lie in the range of from about 0.1 mm to about 60 mm. More preferably, the outer diameter may lie in the range of from about 1 mm to about 10 mm.

In some embodiments, the extruded tubing may undergo a cooling step after the extruding step. The cooling may be carried out by any cooling method known in the art, such as by passing the extruded tubing through a liquid bath. Standard pullers known in the art may be used to transfer the extruded tubing through the liquid bath. According to one embodiment, the extruded tubing may be passed into and out of a water tank of approximately 3 meters in length that is maintained at ambient temperature for cooling. Preferably, the extruded tubing is cooled soon after passing through the exit port of the extruder in order to maintain the dimensions attained during the extrusion process to within the desired tolerances. For example, the tank may be positioned within about 10 cm of the exit port of the extruder.

The cooling step may be followed by a drying step. Any drying technique known in the art may be used. According to one embodiment, the drying step may be carried out by blowing warm air over the extruded tubing upon exit from the liquid bath. For example, the extruded tubing may be pulled out of the liquid bath and conveyed past warm air blowers positioned along a distance of about 10 cm from the bath.

A coating may be applied to at least a portion of the extruded tubing by any of a variety of coating methods known in the art, including, for example, dip coating, spray coating, or spin coating, using a liquid coating formulation. The liquid coating formulation may include the appropriate precursors or monomers to form the desired coating. Such coating formulations may be obtained from any of a number of commercial sources. According to one embodiment, in which the coating is applied to the extruded tubing by dip coating, at least a portion of the extruded tubing may be passed into and out of a coating tank ranging in size from about 30 mm to about 1 m in length which holds the liquid coating formulation.

Preferably, the thickness of the coating applied to the extruded tubing may be in the range of from about 1 micron to about 130 microns. More preferably, the thickness of the coating may be in the range of from about 30 microns to about 130 microns.

Preferably, the coating may be made of a biocompatible material. According to one embodiment, the coating is a hydrophilic coating. The hydrophilic coating may include one or more hydrophilic components, such as, for example, alkylene glycols, alkoxy polyalkylene glycols such as methoxypolyethylene oxide, polyoxyalkylene glycols such as polyethylene oxide, polyethylene oxide/polypropylene oxide copolymers, polyalkylene oxide-modified polydimethylsiloxanes, polyphosphazenes, poly(2-ethyl-2-oxazoline), homopolymers and copolymers of (meth) acrylic acid, poly (acrylic acid), copolymers of maleic anhydride including copolymers of methylvinyl ether and maleic acid, pyrrolidones including poly(vinylpyrrolidone) homopolymers and copolymers of vinyl pyrrolidone, poly(vinylsulfonic acid), acryl amides including poly(N-alkylacrylarnide), poly(vinyl alcohol), poly(ethyleneimine), polyamides, poly(carboxylic acids), methyl cellulose, carboxymethylcellulose, hydroxypropyl cellulose, polyvinylsulfonic acid, water soluble nylons, heparin, dextran, modified dextran, hydroxylated chitin, chondroitin sulphate, lecithin, hyaluranon or derivatives thereof. Hydrophilic polymers may be chain-structured, non-crosslinked and water soluble having a hydrophilic group such as —OH, $—CONH_2$, —COOH, $—NH_2$, —COO—, $—SO_3$, or $—NR_3^+$, where R is alkyl or hydrogen.

According to one embodiment, the coating may be made of a hydrogel. Examples of hydrogels that may be used include, without limitation, polyethylene oxide and its copolymers, polyvinylpyrrolidone and its derivatives, hydroxyethylacrylates or hydroxyethyl(meth)acrylates, polyacrylic acids, polyacrylamides, polyethylene maleic anhydride and its derivatives.

If needed, the coating may undergo a curing or crosslinking step using any of a variety of curing methods known in the art. For example, the coating may be cured using radiation, heat, air, and/or chemicals. According to one embodiment, the coating may be cured using ultraviolet radiation. This may be carried out by conveying the coated tubing through a passageway that includes panels of ultraviolet lights for a duration of time sufficient to cure the coating. The duration of time for curing the coating may depend on the type of coating applied to the tubing and may range from, for example, about 0.1 second to about 180 seconds. Preferably, the duration of time for curing the coating may be about 60 seconds or less. More preferably, the duration of time may be about 10 seconds or less. Even more preferably, the duration of time may be about 3 seconds or less. Most preferably, the duration of time may be about 1 second or less.

The coating may also include one or more bioactive agents. Bioactive agents that may be used in the present invention include, but are not limited to, pharmaceutically acceptable compositions containing any of the bioactive agents or classes of bioactive agents listed herein, as well as any salts and/or pharmaceutically acceptable formulations thereof. Table 1 below provides a non-exclusive list of classes of bioactive agents and some corresponding exemplary active ingredients. Any single bioactive agent or combination of bioactive agents may be used in the present invention.

TABLE 1

| Class | Exemplary Active Ingredients |
|---|---|
| Adrenergic agonist | Adrafinil |
| | Isometheptene |
| | Ephedrine (all forms) |
| Adrenergic antagonist | Monatepil maleate |
| | Naftopidil |
| | Carvedilol |
| | Moxisylyte HCl |
| Adrenergic - Vasoconstrictor/ Nasal decongestant | Oxymetazoline HCl |
| | Norfenefrine HCl |
| | Bretylium Tosylate |
| Adrenocorticotropic hormone | Corticotropin |
| Analgesic | Bezitramide |
| | Acetylsalicysalicylic acid |
| | Propanidid |
| | Lidocaine |
| | Pseudophedrine hydrochloride |
| | Acetominophen |
| | Chlorpheniramine Maleate |
| Anesthetics | Dyclonine HCl |
| | Hydroxydione Sodium |
| | Acetamidoeugenol |
| Anthelmintics | Niclosamide |
| | Thymyl N-Isoamylcarbamate |
| | Oxamniquine |
| | Nitroxynil N-ethylglucamine |
| | Anthiolimine |
| | 8-Hydroxyguinoline Sulfate |
| Anti-inflammatory | Bendazac |
| | Bufexamac |
| | Desoximetasone |
| | Amiprilose HCl |
| | Balsalazide Disodium Salt |
| | Benzydamine HCl |

TABLE 1-continued

| Class | Exemplary Active Ingredients |
|---|---|
| Antiallergic | Fluticasone propionate |
| | Pemirolast Postassium salt |
| | Cromolyn Disodium salt |
| | Nedocromil Disodium salt |
| Antiamebic | Cephaeline |
| | Phanquinone |
| | Thiocarbarsone |
| Antianemic | Folarin |
| | Calcium folinate |
| Antianginal | Verapamil |
| | Molsidomine |
| | Isosorbide Dinitrate |
| | Acebutolol HCl |
| | Bufetolol HCl |
| | Timolol Hydrogen maleate salt |
| Antiarryhythmics | Quinidine |
| | Lidocaine |
| | Capobenic Acid |
| | Encainide HCl |
| | Bretylium Tosylate |
| | Butobendine Dichloride |
| Antiarthritics | Azathioprine |
| | Calcium 3-aurothio-2-propanol-1-sulfate |
| | Glucosamine Beta Form |
| | Actarit |
| Antiasthmatics/Leukotriene antagonist | Cromalyn Disodium |
| | Halamid |
| | Montelukast Monosodium salt |
| Antibacterial | Cefoxitin Sodium salt |
| | Lincolcina |
| | Colisitin sulfate |
| Antibiotics | Gentamicin |
| | Erythromycin |
| | Azithromycin |
| Anticoagulants | Heprin sodum salt |
| | Heprinar |
| | Dextran Sulfate Sodium |
| Anticonvulsants | Paramethadione |
| | Phenobarbital sodium salt |
| | Levetiracetam |
| Antidepressants | Fluoxetine HCl |
| | Paroxetine |
| | Nortiptyline HCl |
| Antidiabetic | Acarbose |
| | Novorapid |
| | Diabex |
| Antiemetics | Chlorpromazine HCl |
| | Cyclizine HCl |
| | Dimenhydrinate |
| Antiglaucoma agents | Dorzolamide HCl |
| | Epinepherine (all forms) |
| | Dipivefrin HCl |
| Antihistamines | Histapyrrodine HCl |
| Antihyperlipoproteinemic | Lovastatin |
| | Pantethine |
| Antihypertensives | Atenolol |
| | Guanabenz Monoacetate |
| | Hydroflumethiazide |
| Antihyperthyroid | Propylthiouracil |
| | Iodine |
| Antihypotensive | Cortensor |
| | Pholedrine Sulfate |
| | Norepinephrine HCl |
| Antimalarials | Cinchonidine |
| | Cinchonine |
| | Pyrimethamine |
| | Amodiaquin Dihydrochloride dihydrate |
| | Bebeerine HCl |
| | Chloroquine Diphosphate |
| Antimigraine agents | Dihydroergotamine |
| | Ergotamine |
| | Eletriptan Hydrobromide |
| | Valproic Acid Sodium salt |
| | Dihydroergotamine mesylate |
| Antineoplastic | 9-Aminocamptothecin |
| | Carboquone |
| | Benzodepa |
| | Bleomycins |

TABLE 1-continued

| Class | Exemplary Active Ingredients |
|---|---|
| | Capecitabine |
| | Doxorubicin HCl |
| Antiparkinsons agents | Methixene |
| | Terguride |
| | Amantadine HCl |
| | Ethylbenzhydramine HCl |
| | Scopolamine N-Oxide Hydrobromide |
| Antiperistaltic; antidiarrheal | Bismuth Subcarbonate |
| | Bismuth Subsalicylate |
| | Mebiquine |
| | Diphenoxylate HCl |
| Antiprotozoal | Fumagillin |
| | Melarsoprol |
| | Nitazoxanide |
| | Aeropent |
| | Pentamideine Isethionate |
| | Oxophenarsine Hydrochloride |
| Antipsycotics | Chlorprothixene |
| | Cyamemazine |
| | Thioridazine |
| | Haloperidol HCl |
| | Triflupromazine HCl |
| | Trifluperidol HCl |
| Antipyretics | Dipyrocetyl |
| | Naproxen |
| | Tetrandrine |
| | Imidazole Salicylate |
| | Lysine Acetylsalicylate |
| | Magnesium Acetylsalicylate |
| Antirheumatic | Auranofin |
| | Azathioprine |
| | Myoral |
| | Penicillamine HCl |
| | Chloroquine Diphosphate |
| | Hydroxychloroquine Sulfate |
| Antispasmodic | Ethaverine |
| | Octaverine |
| | Rociverine |
| | Ethaverine HCl |
| | Fenpiverinium Bromide |
| | Leiopyrrole HCl |
| Antithrombotic | Plafibride |
| | Triflusal |
| | Sulfinpyrazone |
| | Ticlopidine HCl |
| Antitussives | Anethole |
| | Hydrocodone |
| | Oxeladin |
| | Amicibone HCl |
| | Butethamate Citrate |
| | Carbetapentane Citrate |
| Antiulcer agents | Polaprezinc |
| | Lafutidine |
| | Plaunotol |
| | Ranitidine HCl |
| | Pirenzepine 2HCl |
| | Misoprostol |
| Antiviral agents | Nelfinavir |
| | Atazanavir |
| | Amantadine |
| | Acyclovir |
| | Rimantadine HCl |
| | Epivar |
| | Crixivan |
| Anxiolytics | Alprazolam |
| | Cloxazolam |
| | Oxazolam |
| | Flesinoxan HCl |
| | Chlordiazepoxide HCl |
| | Clorazepic Acid Dipotassium salt |
| Broncodialtor | Epinephrine |
| | Theobromine |
| | Dypylline |
| | Eprozinol 2HCl |
| | Etafedrine |
| Cardiotonics | Cymarin |
| | Oleandrin |
| | Docarpamine |

TABLE 1-continued

| Class | Exemplary Active Ingredients |
|---|---|
| | Digitalin |
| | Dopamine HCl |
| | Heptaminol HCl |
| Cholinergic | Eseridine |
| | Physostigmine |
| | Methacholine Chloride |
| | Edrophonium chloride |
| | Juvastigmin |
| Cholinergic antagonist | Pehencarbamide HCl |
| | Glycopyrrolate |
| | Hyoscyamine Sulfate dihydrate |
| Cognition enhancers/ Nootropic | Idebenone |
| | Tacrine HCl |
| | Aceglutamide Aluminum Complex |
| | Acetylcarnitine L HCl |
| Decongestants | Propylhexedrine dl-Form |
| | Pseudoephedrine |
| | Tuaminoheptane |
| | Cyclopentamine HCL |
| | Fenoxazoline HCl |
| | Naphazoline HCl |
| Diagnostic aid | Disofenin |
| | Ethiodized Oil |
| | Fluorescein |
| | Diatrizoate sodium |
| | Meglumine Diatrizoate |
| Diuretics | Bendroflumethiazide |
| | Fenquizone |
| | Mercurous Chloride |
| | Amiloride HCl $2H_2O$ |
| | Manicol |
| | Urea |
| Enzyme inhibitor (proteinase) | Gabexate Methanesulfonate |
| Fungicides | Candicidin |
| | Filipin |
| | Lucensomycin |
| | Amphotericin B |
| | Caspofungin Acetate |
| | Viridin |
| Gonad stimulating principle | Clomiphene Citrate |
| | Chorionic gonadotropin |
| | Humegon |
| | Luteinizing hormone (LH) |
| Hemorheologic agent | Poloxamer 331 |
| | Azupentat |
| Hemostatic | Hydrastine |
| | Alginic Acid |
| | Batroxobin |
| | 6-Aminohexanoic acid |
| | Factor IX |
| | Carbazochrome Salicylate |
| Hypolimpemic agents | Clofibric Acid Magnesium salt |
| | Dextran Sulfate Sodium |
| | Meglutol |
| Immunosuppresants | Azathioprine |
| | 6-Mercaptopurine |
| | Prograf |
| | Brequinar Sodium salt |
| | Gusperimus Trihydrochloride |
| | Mizoribine |
| | Rapamycin and analogs thereof |
| Mydriatic; antispasmodic | Epinephrine |
| | Yohimbine |
| | Aminopentamide dl-Form |
| | Atropine Methylnitrate |
| | Atropine Sulfatemonohydrate |
| | Hydroxyamphetamine (I, HCl, HBr) |
| Neuromuscular blocking agent/Muscle relaxants (skeletal) | Phenprobamate |
| | Chlorzoxazone |
| | Mephenoxalone |
| | Mioblock |
| | Doxacurium Chloride |
| | Pancuronium bromide |
| Oxotocic | Ergonovine Tartrate hydrate |
| | Methylergonovine |
| | Prostaglandin $F_{2\alpha}$ |
| | Intertocine-S |
| | Ergonovine Maleate |
| | Prostoglandin $F_{2\alpha}$ Tromethamine salt |
| Radioprotective agent | Amifostine $3H_2O$ |
| Sedative/Hypnotic | Haloxazolam |
| | Butalbital |
| | Butethal |
| | Pentaerythritol Chloral |
| | Diethylbromoacetamide |
| | Barbital Sodium salt |
| Serenic | Eltoprazine |
| Tocolytic agents | Albuterol Sulfate |
| | Terbutaline sulfate |
| Treatment of cystic fibrosis | Uridine 5'-Triphosphate Trisodium dihydrate salt |
| Vasoconstrictor | Nordefrin (−) Form |
| | Propylhexedrine dl-form |
| | Nordefrin HCl |
| Vasodilators | Nylidrin HCl |
| | Papaverine |
| | Erythrityl Tetranitrate |
| | Pentoxifylline |
| | Diazenium diolates |
| | Citicoline |
| | Hexestrol Bis(β-diethylaminoethyl ether) 2HCl |
| Vitamins | α-Carotene |
| | β-Carotene |
| | Vitamin $D_3$ |
| | Pantothenic Acid sodium salt |

The bioactive agent may be incorporated into the liquid coating formulation and applied to the extruded tubing during the coating process, as described above. Alternatively, the bioactive agent may be applied to the coated tubing after the coating has been deposited.

The coated tubing may be cut to a desired length after application of the coating using tube cutting techniques known in the art. The desired length may vary over a large range, for example, from about 1 cm to about 600 cm. Preferably, the length of the coated tube(s) formed upon cutting ranges from about 10 cm to about 300 cm. More preferably, the length of the coated tube(s) ranges from about 20 cm to about 200 cm. Each coated tube has a distal end and a proximal end. According to one embodiment, the cutting step may be carried out using a rotary cutter available from any of a number of commercial sources.

After cutting, one or more secondary operations may be performed on the coated tube at a temperature in the range of from about 15° C. to about 375° C. in order to form a coated medical device. According to one embodiment, the temperature range for the one or more secondary operations may be from about 15° C. to about 40° C. According to another embodiment, the temperature range may be from about 100° C. to about 375° C. Alternatively, the temperature range may be from about 140° C. to about 210° C. The one or more secondary operations may include, for example, bonding operations and/or forming operations.

Examples of bonding and/or forming operations that may be used in the present invention include, for example, heat bonding, adhesive bonding, laser bonding, solvent bonding, welding, and molding (e.g., insert molding or compression molding). Bonding operations may be carried out using any of a variety of bonding agents known in the art, including, for example, heat, adhesives, radiation, and solvents.

Figure 2:
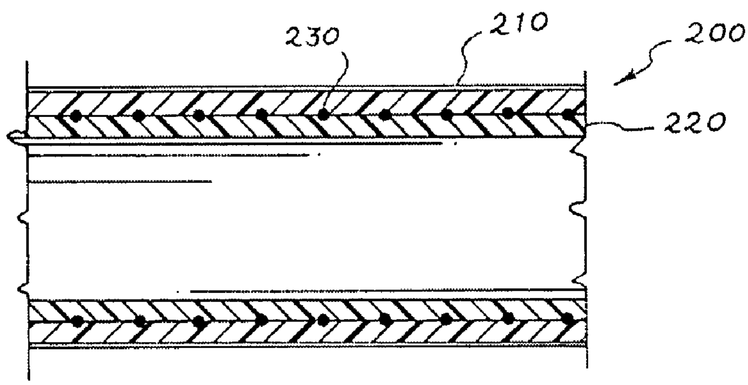
FIG. 2 shows a cross-sectional view of a coated tube bonded to a concentric tube according to one embodiment of the method.

According to one embodiment, the coated tube may be bonded to at least one other structure. As shown in FIG. 2, the other structure may be, for example, a second tube 220 which is disposed within the coated tube 210. The second tube 220 may include one or more lumens, such as, for example, two lumens or three lumens. The second tube 220 may be formed of any material that can be bonded to the coated tube, such as, for example, one or more polymers. Polymers that may be used include, without limitation, fluorocarbons (e.g., polytetrafluoroethylene (PTFE)), polyamides (e.g., nylon), polyether block amides (PEBA), polyolefins, polyimides, polyurethanes, and polyvinyl chloride (PVC). According to one embodiment, the second tube may be made of PTFE. A wound wire or other support structure 230 may be further disposed between the outer wall of the second tube and the inner wall of the coated tube to impart strength to the bonded structure. Preferably, the support structure 230 does not prevent the outer wall of the second tube 220 from coming into contact with and bonding to the inner wall of the coated tube 210 during the bonding process, which may be carried out as described, for example, in U.S. Pat. No. 6,939,337, which is incorporated herein by reference. The bonded structure 200 formed during the bonding process may be used as an implantable or insertable medical device. According to one embodiment, the bonded structure 200 may be used as a catheter.

Figure 3:
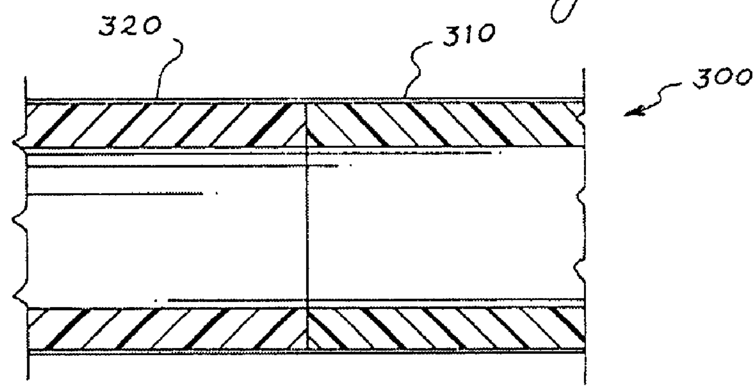
FIG. 3 shows a cross-sectional view of a coated tube bonded to another tube end-to-end according to another embodiment of the method.

In another example of the bonding of the coated tube to another structure, one or both ends of the coated tube 310 may be joined end-to-end to another component 320, as shown in FIG. 3. The other component 320 may be, for example, a tapered tube or tip. The other component 320 may also have a coating applied thereon. The bonding may be carried out at ambient temperature using an adhesive. Alternatively, the bonding may be carried out at an elevated temperature using, for example, a welding process. Such a process may entail heating the coated tube 310 and the other component 320 to a temperature beyond their respective melting points while holding them together end-to-end under pressure, and then allowing them to cool. The bonded structure 300 thereby formed may be used as an implantable or insertable medical device, such as, for example, a catheter.

According to another embodiment, the coated tube may undergo one or more forming operations. The forming operation(s) may be carried out using any forming method known in the art, such as, for example, molding, and may entail the use of, for example, heated molds or dies.

Figure 4:
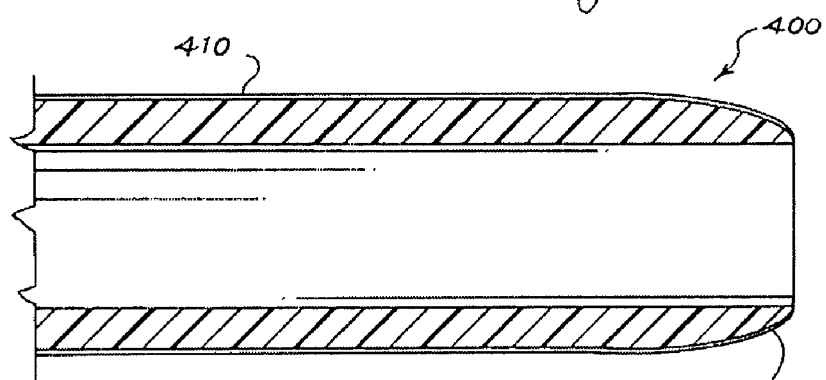
FIG. 4 shows a cross-sectional view of a coated tube formed to have a tapered tip according to another embodiment of the method.

A forming operation may be used to produce, for example, a tapered tip at the distal end of the coated tube. According to one embodiment, to carry out the forming operation, a pin may be inserted into the inner core, or lumen, of the coated tube to maintain the dimensions of the coated tube during forming. The coated tube may then be placed into a bottom section of a mold having a tapered design. A top section of the mold may then be lowered to apply pressure to the tube and heat may be applied. After forming, the mold may be opened and the formed structure removed. Shown in FIG. 4 is an example of such a formed structure 400. The coated tube 410 with the tapered end 420 produced by the forming operation may be used as an implantable or insertable medical device such as, for example, a dilator.

One or more forming operations may also be applied to bonded structures. For example, the bonded structures shown in FIG. 2 and FIG. 3 may further undergo a forming operation, such as, for example, the forming operation described above to form the tapered coated tube shown in FIG. 4. In addition, formed structures may undergo one or more bonding operations. For example, a hub may be bonded to the proximal end of the tapered coated tube shown in FIG. 4, or to either of the bonded structures shown in FIG. 2 and FIG. 3.

The method described herein may provide advantages over conventional methods of producing coated medical devices. In one conventional method, a continuous length of extruded tubing may be cut into one or more tubes prior to the application of the coating. Each tube may further undergo forming and/or bonding operations before the coating is applied. With this approach, each tube is typically handled individually to ensure that the coating does not penetrate the inner core, or lumen, of the cut tube during the coating process.

In the present method, a coating is applied inline to a continuous tubing formed by extrusion, prior to any cutting or secondary operations. Inefficient, labor-intensive steps associated with processing and handling individual tubes for coating (e.g., plugging the ends of each tube and loading each tube into a fixture) may be avoided, thereby leading to a more streamlined manufacturing process.

This method is possible when secondary operations (e.g., bonding and/or forming operations) carried out after application of the coating do not substantially impair the integrity or quality of the coating nor inhibit the formation of an effective and reliable bond between the coated tube and another structure. Such secondary operations may be necessary to form implantable or insertable medical devices from the coated tubes. This method is also advantageous with coating formulations that are curable in a short time, such as, for example, a few seconds or less.

The method described herein may be used to fabricate a variety of implantable or insertable medical devices, such as, for example, diagnostic catheters, drainage catheters, therapeutic catheters, guiding catheters, introducer sheaths, vessel dilators, stents, and tracheostomy tubes.

It is therefore intended that the foregoing detailed description be regarded as illustrative rather than limiting, and that it be understood that it is the following claims, including all equivalents, that are intended to define the spirit and scope of this invention.

We claim:

1. A method for producing a coated medical device, comprising:

- forcing a flowable material through an exit port of an extruder, thereby forming a continuous length of extruded tubing;
- passing the extruded tubing through a liquid bath to cool the extruded tubing;
- depositing a coating onto at least a portion of the extruded tubing after the extruded tubing is cooled, thereby forming a coated tubing;
- cutting the coated tubing to a desired length after depositing the coating, thereby forming a coated tube; and
- performing one or more secondary operations on the coated tube at a temperature in the range of from about 15° C. to about 375° C., thereby forming a coated medical device.

2. The method according to claim 1, further comprising drying the extruded tubing after the cooling.

3. The method according to claim 1, further comprising curing the coating before cutting the coated tubing.

4. The method according to claim 3, wherein the curing is carried out using ultraviolet radiation.

5. The method according to claim 4, wherein the curing is carried out for a duration of time of about 60 seconds or less.

6. The method according to claim 1, wherein the temperature is in the range of from about 100° C. to about 375° C.

7. The method according to claim 1, wherein the temperature is in the range of from about 15° C. to about 40° C.

8. The method according to claim 1, wherein the secondary operations comprise bonding operations.

9. The method according to claim 1, wherein the secondary operations comprise forming operations.

10. The method according to claim 1, wherein the flowable material is a polymer and the extruded tubing is an extruded polymer tubing.

11. The method according to claim 1, wherein the coating is a hydrophilic coating.

12. The method according to claim 11, wherein the hydrophilic coating comprises a hydrogel.

13. The method according to claim 1, wherein the coating has a thickness in the range of from approximately 1 micron to 150 microns.

14. The method according to claim 1, wherein the desired length of the coated tube ranges from about 20 centimeters to about 200 centimeters.

15. The method according to claim 1, further comprising:

drying the extruded tubing after cooling;

curing the coating before cutting the coated tubing, wherein the curing is carried out using ultraviolet radiation and for a time duration of about 60 seconds or less.

16. The method according to claim 15, wherein the material is nylon and the extruded tubing is an extruded nylon tubing, wherein the coating comprises a hydrogel, the coating having a thickness in the range of from approximately 1 micron to 150 microns, wherein the desired length of the coated tube ranges from about 20 centimeters to about 200 centimeters, and wherein the medical device is selected from the group consisting of diagnostic catheter, drainage catheter, guiding catheter, therapeutic catheter, introducer sheath, vessel dilator, stent, and tracheostomy tube.

17. The method according to claim 16, wherein the secondary operations comprise bonding operations.

18. The method according to claim 16, wherein the secondary operations comprise forming operations.

* * * * *